Patented July 17, 1923.

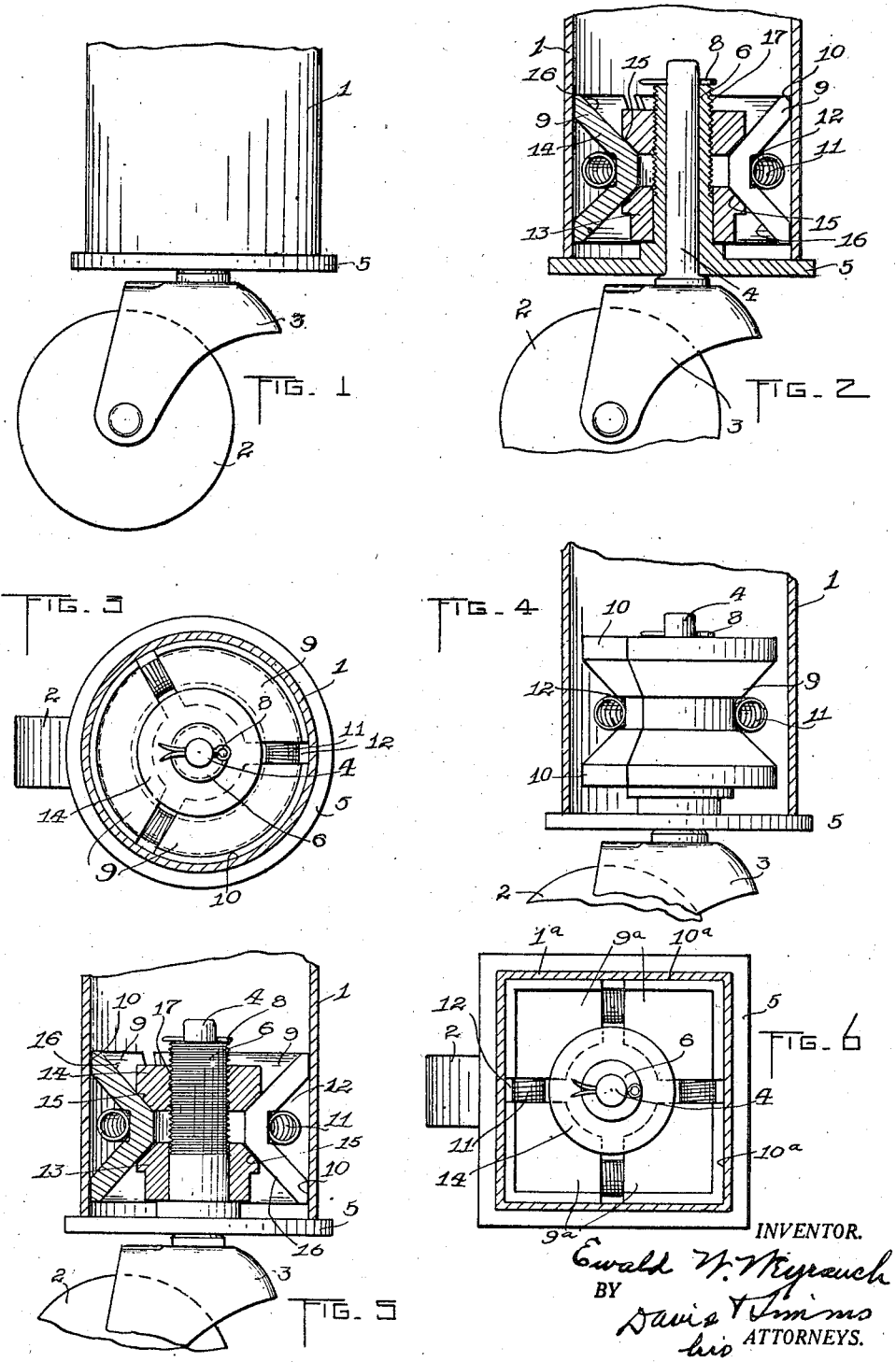

1,461,767

UNITED STATES PATENT OFFICE.

EWALD W. WEYRAUCH, OF ROCHESTER, NEW YORK.

EXPANSIBLE COUPLING MEMBER.

Application filed January 12, 1922. Serial No. 528,733.

*To all whom it may concern:*

Be it known that I, EWALD W. WEYRAUCH, a citizen of the United States, and resident of Rochester, in the county of Monroe and State of New York, have invented certain new and useful Improvements in an Expansible Coupling Member, of which the following is a specification.

The present invention relates to an expansible coupling member and more particularly to the type designed to expand within a socketed or tubular member for the purpose of producing binding engagement with the walls of such socketed or tubular member in order to maintain connection with such member. An object of this invention is to provide a construction which may be readily expanded or contracted from the exterior of the socketed or tubular member with the least possible operation. Still another object of the invention is to provide a coupling member which is designed for firmly engaging with the interior walls of a tubular leg of an article of furniture while providing a bearing for the stem of a castor, said coupling member being adjustable from the exterior of the tubular leg to engage the member with or to disengage it from the leg.

To these and other ends, the invention consists of certain parts and combinations of parts all of which will be hereinafter described, the novel features being pointed out in the appended claims.

In the drawings:—

Fig. 1 is a side view of a portion of a furniture leg showing a castor connected thereto by the improved coupling;

Fig. 2 is a vertical section through the coupling and the lower portion of the furniture leg;

Fig. 3 is a horizontal section through a furniture leg with the coupling member therein;

Fig. 4 is a vertical section through a furniture leg showing the coupling in side elevation;

Fig. 5 is a sectional view showing the central exteriorly threaded hollow post in side elevation; and Fig. 6 is a horizontal section through another embodiment of the invention in which the gripping member of the coupling forms a rectangle in cross section.

Referring to the illustrated embodiment of the invention shown in Figs. 1 to 5, 1 indicates a portion of a tubular furniture leg which may be any tubular or socketed member and 2 the castor wheel which is journalled on a yoke 3 from which a rigid bearing stem 4 projects upwardly. The coupling member forming the subject matter of this invention also acts as a bearing in which the stem 4 of the castor turns. In this instance, the coupling member embodies a cover plate 5 which abuts the lower end of the leg 1 to close the opening in said tube. Extending centrally from this cover plate is a circular hollow post 6 which receives the stem 4 of the castor, the said stem extending through the upper end of the post and being held therein by a cotter pin 8 extending through a transverse bore or opening in the stem 4 and cooperating with the upper end of the post 6.

Surrounding the post is a plurality of gripping members or devices 9 which, in this instance, have curved gripping faces 10 arranged in spaced pairs on each member. A resilient member, in this instance, in the form of an annulus 11 made from resilient wire of helical formation surrounds the gripping members 9 and lies in grooves 12 in said gripping member between the gripping faces 10. Normally this resilient member 11 tends to move the gripping members out of cooperation with the wall of the tube or socket.

Movement of the gripping members into cooperation with the tubular wall or socket may be effected through a spreading means comprising, in this instance, two spreading devices 13 and 14 both surrounding the hollow post 6 and each having a curved bevelled or cam face 15 thereon which will cooperate with cam faces 16 on the gripping members 9. The member 13 is adapted to turn loosely on the post 6, whereas the member 14 is interiorly threaded and engages exterior threads 17 on such post 6.

In the embodiment of the invention shown in Fig. 6, the parts are the same except that the gripping members 9ª have annularly shaped gripping faces 10ª so that they may engage in the corners of a square or rectangular socket or post 1ª.

In applying the expansible coupling member to a socketed member or tube, the castor is first fitted to the coupling members by passing the stem 4 through the hollow post and securing the stem in the post through the cotter pin 8. The coupling member is then introduced into the socket and the cover plate 5 is turned in a direction which causes the spreading member 14 to move downwardly toward the spreading member 13 thus forcing the gripping members 9 outwardly against the tension of the resilient member 11 to cause the gripping faces 10 to enter into binding engagement with the wall of the socket or tube. This engagement is such that it firmly holds the coupling member in engagement with the inner wall of the socket or tube while permitting the coupling member to be readily disconnected, this being effected by turning the cover member 5 in the opposite direction in order to move the spreading member 14 upwardly on the hollow post 6 when the spring or device 11 will throw the gripping member out of gripping relation with the inner wall of the socket or tube.

What I claim as my invention and desire to secure by Letters Patent is:—

1. An expansible coupling member comprising a socket cover plate, a post rigid with and extending centrally from said cover plate, gripping devices surrounding said post adapted to cooperate with the walls of the socket and spreading means for said gripping device operated by the turning of the cover plate and the post.

2. An expansible coupling member comprising a cover plate, a post rigid with and extending centrally from said cover plate, gripping devices surrounding said post and two spreading members both surrounding the post, one of which has a post turning loosely therein and the other of which h screw threaded engagement with the post.

3. An expansible coupling member comprising a cover member, gripping devices mounted on said cover member and having each a pair of gripping faces, a resilient device surrounding said gripping members between said gripping faces, and spreading means for said gripping devices.

4. An expansible coupling member comprising a cover member, a rigid post extending centrally from the cover member, gripping devices surrounding said post and each provided with two gripping faces and a groove between them, a resilient member surrounding said gripping devices, and spreading means for spreading said gripping devices operated through the turning of said post and cover member.

5. In combination with a castor having a yoke provided with a rigid stem, a cover member having a circular hollow post in which said stem turns, means for securing the stem in the post to permit the turning of the stem relatively to the post, gripping members surrounding said post, and spreading means operable by the turning of said post and cover member to spread said gripping members.

6. An expansible coupling member comprising a post externally threaded, two spreading devices, one loosely mounted about the post and the other engaging the screw threaded portion of the post, and gripping devices surrounding said post and engaged by both of said spreading devices.

EWALD W. WEYRAUCH.